Figure 1:
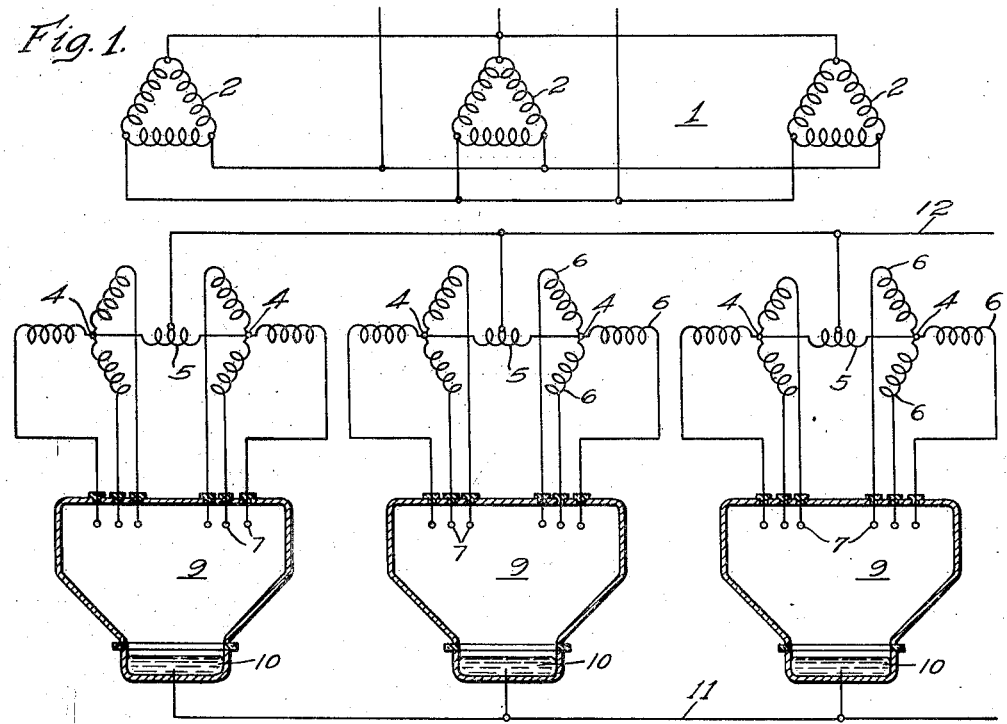

June 29, 1937. H. A. ROSE 2,085,123

TRANSFORMER SYSTEM

Filed June 16, 1933

WITNESSES:
C. J. Weller.
A. Stricklett

INVENTOR
Herbert A. Rose.

BY O. B. Buchanan
ATTORNEY

Patented June 29, 1937

2,085,123

UNITED STATES PATENT OFFICE 2,085,123

TRANSFORMER SYSTEM

Herbert A. Rose, Pittsburgh, Pa., assignor to Westinghouse Electric & Manufacturing Company, East Pittsburgh, Pa., a corporation of Pennsylvania Application June 16, 1933, Serial No. 676,115

2 Claims. (Cl. 175—363)

My invention relates to a transformer system and particularly to a transformer arrangement for insuring the firing of the parallel sections of a sectionalized mercury-arc rectifier.

In the operation of vapor-electric devices it has been found that when arc-chambers are built for capacities above certain ratings, the efficiency and reliability decrease with the increase in capacity. Consequently, it has been found desirable to build arc-chambers of a capacity to secure maximum efficiency and reliability, and to parallel a plurality of these sections to provide a sectionalized unit of the desired total capacity.

In the operation of these sectionalized units there is a tendency for one or more of the sections to remain idle forcing the remaining sections to carry all of the load on the rectifier.

If one or more of the sections remain idle serious damage may result to the section or sections carrying load even though the load is well within safe limits for the unit.

It is an object of my invention to provide a transformer system that will insure ignition of all the main anodes of each section and that each section of the sectionalized unit assumes load.

The transformer system according to my invention comprises a primary adapted for connection to a suitable alternating current source and a plurality of secondaries, there being a secondary for each section or section group of the sectionalized unit. Each of the secondaries comprises a plurality of phase groups with an interphase transformer connecting the phase groups in such a manner that the voltage characteristic of the transformer will be materially altered by the interphase voltage when the section is carrying current.

The transformer according to my invention has a plurality of secondaries, each of said secondaries having a plurality of phase groups with an interphase transformer connecting the midpoints of the groups. When no current flows from the secondaries, the interphase transformer is inactive and the mid-points of the phase groups are electrically tied together to produce a unitary winding such as six-phase diametrical, which provides a voltage differential between the idle transformer secondary and the load system which is effective to insure ignition of the idle section. As current starts to flow the impedance of the interphase winding rapidly reduces the output voltage until the interphase winding is fully excited at which time the voltage of the interphase electrically separates the mid-points of the phase groups and accordingly changes the voltage characteristics of the transformer. For example, the interphase winding could change a six-phase diametrical to a double three-phase or triple two-phase depending upon the interphase connection.

Figure 2:
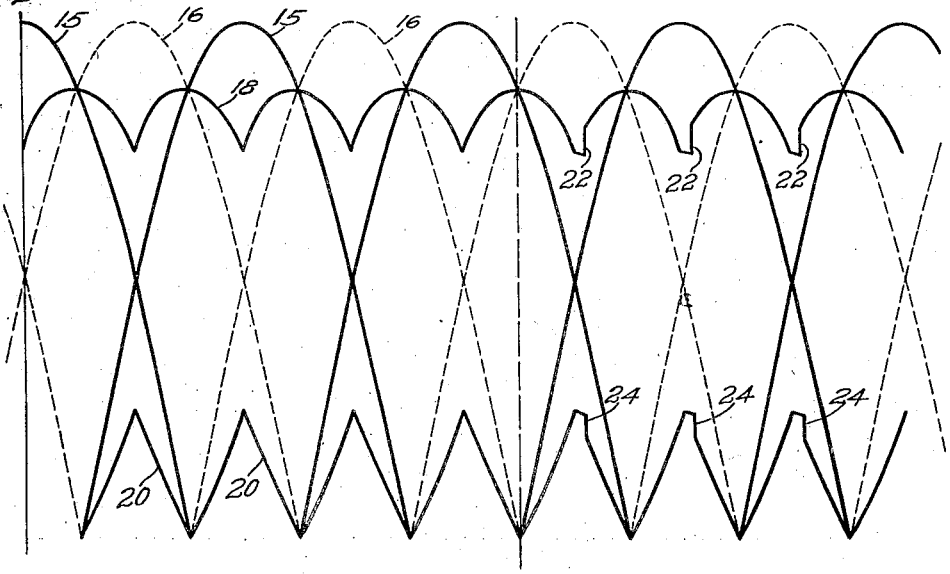

Other objects and advantages of my invention will be apparent from the following detailed description taken in conjunction with the accompanying drawing in which:

Figure 1 is a diagrammatic illustration of a rectifier system embodying my invention and Fig. 2 is a diagrammatic view showing the voltages obtained by my improved transformer.

The apparatus according to my invention comprises a transformer 1 preferably having a plurality of parallel primary sections 2, in this case illustrated as three-phase, delta-connected sections. Coupled with each of the parallel sections 2 of the primary is a complete, independent section 4 of the secondary illustrated as a double Y-Y with inter-phase 5. Each of the sections 4 of the secondary has its phase terminals 6 connected to the anodes 7 of a section 9 of a mercury arc rectifier, the cathodes 10 of the sections 9 being connected to a suitable direct current bus 11 while the return connection 12 of the direct current system is made to the interphase transformers 5. Each section of the rectifier and its associated transformer secondary thus acts independently of all other sections.

When no current is being delivered by the rectifier, the interphase transformer 5 is inactive and the voltage applied to the anodes 7 is substantially six-phase diametrical and is supplied by the three-phase Y connected sections 4, as shown by the alternate heavy and broken line curves 15—16 in Fig. 2. When one of the sections 9 begins to carry current, the cathode potential is raised to substantially the firing anode potential or is separated from the anode potential only by the arc drop in the rectifier. If a six-phase connection were used as by omitting the interphase transformer 5, the voltage available to start a second section would, at all times, be merely the arc drop in the rectifier 9 carrying current and the cathode potential would follow the anode potential in shape and phase relationship.

If, however, an inter-phase transformer 5 is introduced, the no-load voltage is still substantially six-phase diametrical, and each of the sections 9 would have substantially the same voltage applied. However, in the sections carrying current the interphase winding is excited and the interphase voltage separates the phase groups into a double three phase arrangement thereby producing a cathode voltage in the active sections as shown by curve 18 of Fig. 2.

The sections 4 of the transformer connected to the non-firing rectifier sections 9 still retain the six-phase diametrical voltage 15—16. However as the cathodes are solidly connected together, the cathode voltage of the non-firing sections would be that of the sections carrying current. Therefore, a difference in potential or ignition voltage exists between the cathodes and anodes of the idle sections as shown by the sharply peaked voltages 20 shown in Fig. 2.

When an appreciable current flows in the active sections of the rectifier, an appreciable time is necessary to transfer or commutate the current in sequential phase windings. During the commutating or overlap period the cathode potential is substantially an average of the active phase voltages and follows curve 22 of Fig. 2 until commutation has been completed.

This prolonged application of the peak 24 of the ignition voltage 20 still further insures firing of any idle sections and that all sections assume load.

The overlap period and consequently the prolonged application of the peak 24 of the firing potential increases with increasing load.

While I have shown and described a specific embodiment of my invention it is apparent that many changes and modifications may be made therein without departing from the spirit and scope of my invention. I desire, therefore, that only such limitations shall be imposed as are embodied in the accompanying claims or as necessitated by the prior art.

I claim as my invention:

1. A rectifier system comprising a plurality of parallel, individually complete, polyphase rectifier sections normally operating as a unit, transformer means for supplying energy to said rectifier sections, said transformer means comprising a plurality of sections corresponding in number to the number of rectifier sections, each section of said transformer means including a primary winding system and a polyphase secondary winding system, said secondary winding systems being in phase with each other, said secondary winding systems being substantially independent of each other in operation, each secondary winding system having a plurality of phase groups, an independent interphase transformer means connected between said phase groups, said interphase transformer means being effective on flow of current therein to change the mode of operation of its associated secondary winding system to reduce the terminal voltage of the rectifier section fed thereby so that a firing potential is maintained on each of said rectifier sections until they carry current.

2. A rectifier system comprising a polyphase rectifier having a plurality of individually complete, parallel operating, polyphase sections, polyphase transformer means for supplying energy to said rectifier sections, said transformer means having a sectionalized primary winding means and a plurality of in phase, secondary polyphase winding means, each of said secondary winding means supplying polyphase energy to an individual section of said sectionalized rectifier, each of said secondary winding means having a plurality of phase groups, substantially independent interphase winding means connected between said phase groups, said interphase winding means being energized by current flow in the rectifier section fed by said secondary winding, means for changing the mode of operation of the rectifier section, said changed mode of operation producing a lower terminal voltage than when not carrying current, whereby a firing potential is impressed on all non-firing sections.

HERBERT A. ROSE.